(12) United States Patent
Le-Khac et al.

(10) Patent No.: US 7,041,708 B2
(45) Date of Patent: May 9, 2006

(54) ULTRAVIOLET-CURABLE POLYURETHANE COMPOSITIONS

(75) Inventors: Bi Le-Khac, West Chester, PA (US); Karl W. Haider, Hurricane, WV (US); Ramesh Subramanian, Coraopolis, PA (US); Charles A. Gambino, McDonald, PA (US); James Edward Kassner, Wexford, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/976,684

(22) Filed: Oct. 29, 2004

(65) Prior Publication Data

US 2005/0107485 A1    May 19, 2005

Related U.S. Application Data

(63) Continuation-in-part of application No. 10/714,720, filed on Nov. 17, 2003, now abandoned.

(51) Int. Cl.
| | | |
|---|---|---|
| *C08G 18/34* | (2006.01) | |
| *C08G 18/28* | (2006.01) | |
| *C08G 18/32* | (2006.01) | |
| *C08G 18/30* | (2006.01) | |
| *C08G 18/06* | (2006.01) | |

(52) U.S. Cl. .............. 522/97; 522/90; 522/92; 522/93; 522/104; 522/150; 522/152; 522/153; 522/154; 522/173; 522/174; 522/179; 522/181; 525/43; 525/46; 525/44; 428/423.1; 428/423.9; 428/424.2; 428/355 N

(58) Field of Classification Search .............. 522/90, 522/92, 93, 97, 104, 150, 152, 153, 154, 522/173, 174, 179, 181; 525/43, 46, 44; 428/423.1, 423.9, 424.2, 355 N
See application file for complete search history.

(56) References Cited

U.S. PATENT DOCUMENTS

| 5,014,361 | A | 5/1991 | Gray | 2/167 |
|---|---|---|---|---|
| 5,610,205 | A | 3/1997 | Yang et al. | 522/102 |

FOREIGN PATENT DOCUMENTS

| DE | 102 09 449 A1 | 9/2003 |
|---|---|---|
| GB | 1 432 230 | 4/1976 |

*Primary Examiner*—James J. Seidleck
*Assistant Examiner*—Sanza L. McClendon
(74) *Attorney, Agent, or Firm*—Joseph C. Gil; Lyndanne M. Whalen; John E. Mrozinski, Jr.

(57) ABSTRACT

Ultraviolet (UV)-curable polyurethane compositions are provided which are made by reacting an isocyanate with an ultraviolet (UV)-curable polyol that is made by co-polymerizing an alkylene oxide, an unsaturated carboxylic acid or anhydride and a hydroxy functional compound and which has an ultra-low level of unsaturation. The inventive ultraviolet (UV)-curable polyurethane compositions may find use in or as coatings, adhesives, sealants, elastomers and the like.

42 Claims, No Drawings

ULTRAVIOLET-CURABLE POLYURETHANE COMPOSITIONS

This application is a Continuation-in-Part of U.S. Ser. No. 10/714,720 filed on Nov. 17, 2003, now abandoned.

FIELD OF THE INVENTION

The present invention relates in general to compositions, and more specifically, to ultraviolet (UV)-curable polyurethane compositions containing an isocyanate and an ultraviolet (UV)-curable polyol which is made by co-polymerizing an unsaturated carboxylic acid or anhydride, an alkylene oxide and a hydroxy functional compound and which has an ultra-low level of unsaturation.

BACKGROUND OF THE INVENTION

Papalos et al., in U.S. Statutory Invention Registration No. H 1,712, disclose radiation-curable compositions containing monoalkyl or mono-aralkyl ether di-acrylates or di-methacrylates of particular ethoxylated and/or propoxylated polyols. These polyol derivatives substituted with hydrophobic ether functionalities are said to constitute UV-curable diluents that can be isolated in excellent yields with minimal losses during the manufacturing process. The UV-curable diluents of Papalos et al. are said to be useful in radiation-curable compositions.

U.S. Pat. No. 4,876,384 issued to Higbie et al., teaches reactive diluents for radiation curable compositions. The diluents are lower alkyl ether acrylates and methacrylates of particular alkoxylated and non-alkoxylated polyols. Examples are mono-methoxy trimethylolpropane diacrylate, mono-methoxy neopentyl glycol monoacrylate and mono-methoxy, ethoxylated neopentyl glycol monoacrylate having an average of about two moles of ethylene oxide.

No mention is made in either of these disclosures of making a coating, adhesive, sealant or elastomer from the compound by combining it with an isocyanate to form a polyurethane.

Polyurethane is typically made by reacting a polyol with an isocyanate. The majority of polyoxyalkylene polyether polyols are polymerized through base catalysis. For example, polyoxypropylene diols are prepared by the base-catalyzed oxypropylation of a difunctional initiator such as propylene glycol. During base-catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21. Unsaturation is measured in accordance with ASTM D-2849-69 "Testing Urethane Foam Polyol Raw Materials," and expressed as milliequivalents of unsaturation per gram of polyol (meq/g). Due to this continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4,000 Dalton (Da) molecular weight, the content of monofunctional species may be between 30 and 40 mole percent. In such cases, the average functionality is lowered to 1.6 to 1.7 from the nominal, or theoretical functionality of 2.0. In addition, base-catalyzed polyols have a high polydispersity ($M_w/M_n$) due to the presence of the substantial, low molecular weight fractions.

Lowering unsaturation and the attendant high monol fraction in polyoxypropylene polyols has been touted as a means of providing polyurethane compositions with improved properties. Often, formulations must be chosen to balance conflicting properties. For example, increases in tensile strength are often accompanied by a decrease in elongation.

Therefore, a need exists in the art for UV-curable polyurethane compositions having a low modulus, high elongation, high tensile strength and solvent resistance that are suitable for use in or as coatings, adhesives, sealants, elastomers and the like.

SUMMARY OF THE INVENTION

Accordingly, the present invention alleviates the need in the art by providing an ultraviolet (UV)-curable polyurethane composition made from an isocyanate and an ultraviolet (UV)-curable polyol that is made by co-polymerizing an alkylene oxide, an unsaturated carboxylic acid or anhydride and a hydroxy functional compound and which has an ultra-low level of unsaturation. The ultraviolet UV-curable polyurethane compositions of the present invention may be used in or as coatings, adhesives, sealants, elastomers and the like.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

The molecular weights and equivalent weights given herein in Da (Daltons) are number average molecular weights and number average equivalent weights, respectively, unless specified otherwise.

The present invention provides an ultraviolet (UV)-curable polyurethane composition made from at least one isocyanate and at least one ultraviolet (UV)-curable polyol comprising the reaction product of 30 to 70 wt. % of a hydroxy functional compound having a functionality of 2 to 3, 1 to 10 wt. % of an unsaturated carboxylic acid or anhydride and 20 to 69 wt. % of an alkylene oxide, wherein the at least one ultraviolet (UV)-curable polyol has an unsaturation of less than 0.01 meq/g.

The present invention further provides a process of making an ultraviolet (UV)-curable polyurethane composition involving reacting at least one isocyanate with at least one ultraviolet (UV)-curable polyol comprising the reaction product of 30 wt. % to 70 wt. % of a hydroxy functional compound having a functionality of 2 to 3, 1 wt. % to 10 wt. % of an unsaturated carboxylic acid or anhydride and 20 wt. % to 69 wt. % of an alkylene oxide, such that the sum of the percentages totals 100, wherein the at least one ultraviolet (UV)-curable polyol has an unsaturation of less than 0.01 meq/g and curing the ultraviolet (UV)-curable polyurethane composition.

The present invention yet further provides a coated substrate comprising a substrate having applied thereto an ultraviolet (UV)-curable polyurethane composition comprising at least one isocyanate and at least one ultraviolet (UV)-curable polyol comprising a reaction product of 30 wt. % to 70 wt. % of a hydroxy functional compound having a functionality of 2 to 3, 1 wt. % to 10 wt. % of an unsaturated carboxylic acid or anhydride and 20 wt. % to 69 wt. % of an alkylene oxide, such that the sum of the percentages totals 100, wherein the at least one ultraviolet (UV)-curable polyol has an unsaturation of less than 0.01 meq/g.

The co-polymers of alkylene oxide and unsaturated carboxylic acids or anhydrides included in the ultraviolet (UV)-curable polyurethane compositions of the present invention are photo-curable. It has been found, surprisingly, that unsaturated carboxylic acids and anhydrides such as cis-1,2,3,6-tetrahydrophthalic anhydride can co-polymerize well with alkylene oxides such as propylene oxide (PO) in the presence of a double metal cyanide (DMC) catalyst. This conversion is complete even at low concentrations of monomer.

The hydroxy functional compound may be polypropylene oxide, polyethylene oxide, polybutylene oxide, copolymers of propylene oxide and ethylene oxide, copolymers of propylene oxide and butylene oxide, copolymers of butylene oxide and ethylene oxide, and mixtures thereof. Preferred as the hydroxy functional compound is polyoxypropylene. The hydroxy functional compound is preferably used in amounts of 30 to 70 wt. %, more preferably 30 to 60 wt. % and most preferably 40 to 60 wt. %. The functionality of the hydroxy functional compound is from 2 to 3.

The unsaturated carboxylic acid or anhydride may be any compounds bearing at least one C=C group and at least one carboxylic acid or anhydride group. Examples include cis-1,2,3,6-tetrahydrophthalic acid and anhydride and maleic acid and anhydride. The unsaturated carboxylic acid or anhydride may be used in amounts of 1 to 10 wt. %, more preferably 1 to 5 wt. % and most preferably 2 to 5 wt. %.

The alkylene oxide may be propylene oxide, ethylene oxide, butylene oxide, the like, and mixtures thereof. Preferably, the alkylene oxide is propylene oxide. The alkylene oxide may be used in amounts of 20 to 60 wt. %, more preferably 20 to 50 wt. % and most preferably 25 to 50 wt. %.

Recent advances in DMC catalysts and polyoxyalkylation processes have enabled the practical preparation of ultra-low unsaturation polyoxypropylene polyols. High molecular weight polyols, for example those in the 4,000 Da to 8,000 Da molecular weight range, typically exhibit unsaturation in the range of 0.004 to 0.007 meq/g if catalyzed by these DMC catalysts. At those levels of unsaturation, the amount of monofunctional species is only 2 mole percent or less. Moreover, gel permeation chromatography (GPC) analysis shows those polyols to be virtually monodisperse, often exhibiting polydispersities less than 1.10. A number of such polyols have been commercialized, by the assignee of the present disclosure, as ACCLAIM polyols. These ultra-low unsaturation polyols have been found to be quantitatively different than both conventional polyols and low unsaturation polyols.

Therefore, the catalyst used to produce the ultraviolet (UV)-curable polyol used in the ultraviolet (UV)-curable polyurethane compositions of the present invention is preferably a double metal cyanide (DMC) catalyst, such as those disclosed in U.S. Pat. Nos. 5,470,813 and 5,482,908, the entire contents of which are incorporated herein by reference. Through the use of the catalysts disclosed in those references, unsaturation levels in the range of 0.004 to 0.008 may be achieved.

Both aliphatic and aromatic di- and polyisocyanates may be used to prepare the ultraviolet (UV)-curable polyurethane compositions of the present invention. Diisocyanates are preferred; however it is within the scope of the invention to include a minor amount, i.e., not more than approximately 20 mole percent, of a tri- or higher-functionality isocyanate. Preferred isocyanates include, but are not limited to, linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 2,4' and 4,4'-methylene diphenylene diisocyanate (2,4'- and 4,4'-MDI, respectively), tetramethylxylylene diisocyanate, isocyanate terminated prepolymers and the like. Less preferred aromatic diisocyanates include the polymethylene polyphenylene polyisocyanates having functionalities greater than two. Also preferred are modified diisocyanates prepared by reacting one or more diisocyanates with themselves, or with a low molecular weight isocyanate reactive compound to form urea-modified, urethane-modified, carbodiimide-modified, allophanate-modified, uretonimine-modified, biuret-modified, and other modified isocyanates, many of which are commercially available. More than one isocyanate may be used. Particularly preferred is 2',4-toluene diisocyanate (2', 4-TDI).

The polyurethane compositions of the present invention can include one or more photoinitiators. Suitable photoinitiators include, for example, aromatic ketone compounds, such as benzophenones, alkylbenzophenones, Michler's ketone, anthrone and halogenated benzophenones. Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene 9,10-dichloroanthracene; 4,4-dichlorobenzophenone; thioxanthone; isopropyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; maleimides and their derivatives; and mixtures thereof. There are a number of suitable photoinitiators commercially available from Ciba including IRGACURE 184 (1-hydroxy-cyclohexyl-phenyl-ketone), IRGACURE 819 phenyl (bis(2,4,6-trimethylbenzoyl)-phenylphosphineoxide), IRGACURE 1850 (a 50/50 mixture of bis(2,6-dimethoxybenzoyl)-2,4,4-trimethylpentyl-phosphine oxide and 1-hydroxy-cyclohexyl-phenyl-ketone), IRGACURE 1700 (a 25/75 mixture of bis(2,6-dimethoxybenzoyl)-2,4,4-trimethylpentyl-phosphine oxide and 2-hydroxy-2-methyl-1-phenyl-propan-1-one), IRGACURE 907 (2-methyl-1 [4-(methylthio)phenyl]-2-morpholonopropan-1-one), DAROCUR MBF (a pheny glyoxylic acid methyl ester), IRGACURE 2020 Photoinitiator Blend (20% by weight of phenyl bis (2,4,6-trimethyl benzoyl) phosphine oxide (IRG819) and 80% by weight of 2-Hydroxy-2-methyl-1-phenyl-1-propanone (DAROCUR 1173)) and DAROCUR 4265 (a 50/50 mixture of bis(2,4,6-trimethylbenzoyl)-phenylphosphineoxide and 2-hydroxy-2-methyl-1-phenyl-propan-1-one). The foregoing list is meant to be illustrative only and is not meant to exclude any suitable photoinitiators. As those skilled in the art are aware, the concentrations at which photoinitiators are effectively employed is not particularly critical, but may be 0.3 to 10 wt. %, and more preferably, from 1 to 5 wt. % of the final product.

Those skilled in the art of photochemistry are fully aware that photoactivators can be used in combination with the aforementioned photoinitiators and that synergistic effects are sometimes achieved when such combinations are used. Photoactivators are so well known in the art that no further description is required to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

Curing may also take place in the presence of compounds that generate free radicals such as (hydro)peroxides optionally in the presence of accelerators. and cationically in the presence of superacids like the phenyl sulfonium metal salts.

The ultraviolet (UV)-curable polyurethane compositions of the present invention may preferably be used in the preparation of coatings, adhesives, sealants, elastomers and the like. Depending upon the particular application, the inventive ultraviolet (UV)-curable polyurethane compositions may also contain additives commonly used in the art including, but not limited to, dispersing agents, flow aid agents, thickening agents, defoaming agents, deaerating agents, pigments, fillers, flattening agents and wetting agents. In addition, where the article to be coated is of such a shape that portions of the coating may not be exposed to radiation, it is possible to add materials which crosslink through carboxyl, hydroxyl, amino groups or moisture. Such materials include carbodiimides, aziridines, polyvalent cations, melamine/formaldehyde, epoxies, and isocyanates. Suitable carbodiimides are known and described, e.g., in U.S. Pat. Nos. 5,104,928, 5,574,083, 5,936,043, 6,194,522, 6,300,409 and 6,566,437. Where used, such crosslinkers should be in an amount of from 0.1 to 35% by weight based on the combined weight of the isocyanate and UV-curable polyol.

To make one of a coating, adhesive, sealant, elastomer and the like, the isocyanate and ultraviolet (UV)-curable polyol may be first mixed together and then any other additives added thereto. The inventive ultraviolet (UV)-curable polyurethane compositions may be applied onto various substrates by any method known to those skilled in the art, including, but not limited to, spraying, rolling, knife-coating, pouring, brushing, dipping, putty knife or squeegee.

The compositions of the present invention are highly compatible with both porous and nonporous substrates. The compatibility with nonporous materials allows these compositions to be applied onto a wide range of nonporous polymers, including polybutylene terephthalate, polyethylene terephthalate, other polyester, polyolefin, polymethyl (meth)acrylate, vinyl acetate, ABS, polyvinyl, polystyrene, high impact polystyrene, polycarbonate, polyurethane, epoxy, polyimide, polyamide, polyamideimide, polyacrylate, polyacrylamide, combinations of these, and the like. Because radiation curing generates little heat, the compositions of the present invention may also be used on heat sensitive substrates. The compositions of the present invention may also be applied to metal, glass and ceramic.

The inventive ultraviolet (UV)-curable polyurethane compositions are curable using radiation sources having wavelengths of at least 300 nm and preferably from 320 to 450 nm. The distance between the surface and the radiation source will depend on spectral overlap of lamp emission spectrum and photoinitiator absorption spectrum and on the intensity of the lamp. The length of time the coated substrate is subjected to the radiation will depend on the spectral overlap of lamp emission spectrum and photoinitiator absorption spectrum, the distance form the radiation sources, and the lamp intensity, solvent content in the formulation, temperature and humidity of the cure surroundings but will generally be less than 10 minutes and may be as short as 0.1 seconds.

This radiation can be provided by any suitable source such as UV lamps with reduced infrared emission or UV lamps fitted with filters to eliminate infrared emissions or so-called LEDs (light-emitting devices) emitting radiation in the wavelength range noted. Particularly useful commercially available devices are available from Panacol-Elosol GmbH: (PANACOL UV H-254 and PANACOL UVF-450 lamps); from Honle UV America Inc. (HONLE UVA HAND 250 CUL); from Pro Motor Car Products Inc. (PMP 250 watt metal halide lamp); from H&S Autoshot (CURE-TEK UVA-400); from UV Process Supply Inc. (CON-TROL-CURE SCARAB-250 UV-A shop lamp system, CON-TROL-CURE—UV LED CURE-ALL 415, CON-TROL-CURE—UV LED CURE-ALL 390); from UV Light Technologies (UV H253 UV lamp); from Phoseon Technology (RADION RX10 module curing using solid state high intensity UV light source); from Quantum Technologies (Low intensity microwave UV System Model QUANT-18/36); from Inretech Technologies (WORKLED); from Inretechn Technologies (Flashlight MC with 20xLED adapter); and Phillips (TL03 lamp with radiation output above 380 nm).

The present invention is further illustrated, but is not to be limited, by the following examples. All quantities given in "parts" and "percents" are understood to be by weight, unless otherwise indicated.

EXAMPLES

Synthesis of a Propylene Oxide/Maleic Anhydride Copolymer

A clean, dry one-liter polyol reactor was charged with a 425 MW polypropylene glycol (213 g; 0.5 moles, commercially available as PPG-425 from Bayer MaterialScience), maleic anhydride (148 g; 1.51 moles) and a DMC catalyst (0.2 g). The mixture was heated with stirring under vacuum (0.5 psia) with a nitrogen purge and held at 130° C. for 30 minutes to remove traces of water from the polyol. The vacuum valve was closed, thus blocking the reactor, and propylene oxide (50 g; 0.86 moles) was introduced into the reactor at a rate of 10 g/minute. At the end of the activation feed, the pressure in the reactor had increased to 22 psia. About 10 minutes after the activation feed was completed, the pressure had dropped to 10 pounds, indicating activation of the catalyst. Additional propylene oxide (390 g; 6.70 moles) was added over 3.5 hours while maintaining the reaction temperature at 130° C. After the feed, the mixture was allowed to stir an additional 30 minutes, followed by a vacuum strip for 30 minutes (both at 130° C.). The product was cooled to 60° C. and drained from the reactor to yield 776 g of a clear yellow liquid.

Analysis of the product gave a hydroxyl number of 70.9 mg KOH/g (theory=70.3) and a number average MW of 1261 g/mole with a polydispersity of 1.25 measured by gel permeation chromatography (GPC). There was no evidence for residual monomeric maleic anhydride in the polyol by GPC.

Examples 1–3

The propylene oxide/maleic anhydride polyol made using the above described procedure (100 parts) was mixed well with 32.8 parts of an isocyanate containing aliphatic urethane acrylate (commercially available as ROSKYDAL 2337 from Bayer MaterialScience), 9.3 parts of a photoinitiator (a 50/50 mixture of bis(2,4,6-trimethylbenzoyl)-phenylphosphineoxide and 2-hydroxy-2-methyl-1-phenyl-propan-1-one which is commercially available from Ciba Specialty Chemicals as DAROCUR 4265), 2.2 parts of a second photoinitiator (1-hydroxy-cyclohexyl-phenyl-ketone which is commercially available from Ciba Specialty Chemicals as IRGACURE 184), 1.2 parts of dibutyltin dilaurate (commercially available as DABCO T12 from Air Products), 3 parts of an organofunctional silicone oil (commercially available from Bayer AG as BAYSILONE OL44) and 100 parts of butyl acetate. This solvent-borne formulation was drawn down on steel panels, cured under the various conditions shown below in Table I and subjected to a MEK double rub test. The MEK double rub test is a standard test known in the art for determining solvent resistance. The test involves saturating a cloth with methyl ethyl ketone and rubbing the coated panels with one complete forward and backward motion over the coated surface.

TABLE I

| Ex. No. | Cure Conditions | MEK Double Rubs |
| --- | --- | --- |
| 1 | Bake at 100° C. for 30 min. | 35 pass |
| 2 | UV-A exposure* for 4 min. at 10 in. | 100 pass - film softens |
| 3 | Bake + UV | 200 pass |

*using H&S Autoshot low intensity UVA400 lamp

As can be appreciated from reference to Table I, the UV curing of double bonds greatly improves the solvent resistance of the polyurethane coatings made with the inventive ultraviolet (UV)-curable polyol.

Examples 4 and 5

The propylene oxide/maleic anhydride polyol made using the above described procedure (100 parts) was mixed well with 18.8 parts of an isocyanate aliphatic trimer (commercially available from Bayer MaterialScience as DESMODUR N3600), 9.3 parts of photoinitiator (DAROCUR 4265), 2.2 parts of a second photoinitiator (IRGACURE 184), 1.2 parts dibutyltin dilaurate (DABCO T12), 3 parts of BAYSILONE OL44 and 100 parts of butyl acetate. This solvent-borne formulation was drawn down on steel panels, cured under the various conditions shown below in Table II and subjected to a MEK double rub test. The results are summarized below in Table II.

TABLE II

| Ex. No. | Cure Conditions | MEK Double Rubs |
| --- | --- | --- |
| 4 | Bake at 100° C. for 30 min. | 37 pass |
| 5 | UV-A exposure* for 4 min. at 10 in. | 100 pass - film softens |

*using H&S Autoshot low intensity UVA400 lamp

As can be appreciated from reference to Table II, the UV curing of double bonds greatly improves the solvent resistance of the polyurethane coatings made with the inventive ultraviolet (UV)-curable polyol.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. An ultraviolet (UV)-curable polyurethane composition comprising:
   at least one isocyanate; and
   at least one ultraviolet (UV)-curable polyol comprising a reaction product of
      about 30 wt. % to about 70 wt. % of a hydroxy functional compound having a functionality of about 2 to about 3;
      about 1 wt. % to about 10 wt. % of an unsaturated carboxylic acid or anhydride; and
      about 20 wt. % to about 69 wt. % of an alkylene oxide, such that the sum of the percentages totals 100,
      wherein the at least one ultraviolet (UV)-curable polyol has an unsaturation of less than about 0.01 meq/g.

2. The ultraviolet (UV)-curable polyurethane composition according to claim 1, wherein the hydroxy functional compound comprises about 30 wt. % to about 60 wt. % of the at least one ultraviolet (UV)-curable polyol.

3. The ultraviolet (UV)-curable polyurethane composition according to claim 1, wherein the hydroxy functional compound comprises about 40 wt. % to about 60 wt. % of the at least one ultraviolet (UV)-curable polyol.

4. The ultraviolet (UV)-curable polyurethane composition according to claim 1, wherein the hydroxy functional compound is chosen from polypropylene oxide, polyethylene oxide, polybutylene oxide, copolymers of propylene oxide and ethylene oxide, copolymers of propylene oxide and butylene oxide, copolymers of butylene oxide and ethylene oxide, and mixtures thereof.

5. The ultraviolet (UV)-curable polyurethane composition according to claim 1, wherein the unsaturated carboxylic acid or anhydride comprises about 1 wt. % to about 5 wt. % of the at least one ultraviolet (UV)-curable polyol.

6. The ultraviolet (UV)-curable polyurethane composition according to claim 1, wherein the unsaturated carboxylic acid or anhydride comprises about 2 wt. % to about 5 wt. % of the at least one ultraviolet (UV)-curable polyol.

7. The ultraviolet (UV)-curable polyurethane composition according to claim 1, wherein the unsaturated carboxylic acid or anhydride is chosen from cis-1,2,3,6-tetrahydrophthalic acid, cis-1,2,3,6-tetrahydrophthalic anhydride, maleic acid, maleic anhydride and mixtures thereof.

8. The ultraviolet (UV)-curable polyurethane composition according to claim 1, wherein the alkylene oxide comprises about 20 wt. % to about 50 wt. % of the at least one ultraviolet (UV)-curable polyol.

9. The ultraviolet (UV)-curable polyurethane composition according to claim 1, wherein the alkylene oxide comprises about 25 wt. % to about 50 wt. % of the at least one ultraviolet (UV)-curable polyol.

10. The ultraviolet (UV)-curable polyurethane composition according to claim 1, wherein the alkylene oxide is chosen from propylene oxide, ethylene oxide, butylene oxide and mixtures thereof.

11. The ultraviolet (UV)-curable polyurethane composition according to claim 1, wherein the isocyanate is chosen from 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, isophorone diisocyanate, the cyclohexane diisocyanates, hydrogenated tetramethylxylylene diisocyanate, hydrogenated toluene diisocyanates, hydrogenated methylene diphenylene diisocyanates, toluene diisocyanates, methylene diphenylene diisocyanates, polymethylene polyphenylene polyisocyanates and isocyanate-terminated prepolymers.

12. The ultraviolet (UV)-curable polyurethane composition according to claim 1 further including at least one of a photoinitiator, photoactivator and a cross-linking agent.

13. The ultraviolet (UV)-curable polyurethane composition according to claim 1, wherein the ultraviolet (UV)-curable polyol has an unsaturation of about 0.004 to about 0.008 meq/g.

14. One of a coating, adhesive, sealant and elastomer containing the ultraviolet (UV)-curable polyurethane composition according to claim 1.

15. In a process for producing one of a coating, adhesive, sealant and elastomer, the improvement comprising including the ultraviolet (UV)-curable polyurethane composition according to claim 1.

16. A process of making an ultraviolet (UV)-curable polyurethane composition comprising:
reacting
at least one isocyanate with
at least one ultraviolet (UV)-curable polyol comprising the reaction product of
about 30 wt. % to about 70 wt. % of a hydroxy functional compound having a functionality of about 2 to about 3,
about 1 wt. % to about 10 wt. % of an unsaturated carboxylic acid or anhydride, and
about 20 wt. % to about 69 wt. % of an alkylene oxide, such that the sum of the percentages totals 100,
wherein the at least one ultraviolet (UV)-curable polyol has an unsaturation of less than about 0.01 meq/g; and
curing the ultraviolet (UV)-curable polyurethane composition.

17. The process according to claim 16, wherein the hydroxy functional compound comprises about 30 wt. % to about 60 wt. % of the at least one ultraviolet (UV)-curable polyol.

18. The process according to claim 16, wherein the hydroxy functional compound comprises about 40 wt. % to about 60 wt. % of the at least one ultraviolet (UV)-curable polyol.

19. The process according to claim 16, wherein the hydroxy functional compound is chosen from polypropylene oxide, polyethylene oxide, polybutylene oxide, copolymers of propylene oxide and ethylene oxide, copolymers of propylene oxide and butylene oxide, copolymers of butylene oxide and ethylene oxide, and mixtures thereof.

20. The process according to claim 16, wherein the unsaturated carboxylic acid or anhydride comprises about 1 wt. % to about 5 wt. % of the at least one ultraviolet (UV)-curable polyol.

21. The process according to claim 16, wherein the unsaturated carboxylic acid or anhydride comprises about 2 wt. % to about 5 wt. % of the at least one ultraviolet (UV)-curable polyol.

22. The process according to claim 16, wherein the unsaturated carboxylic acid or anhydride is chosen from cis-1,2,3,6-tetrahydrophthalic acid, cis-1,2,3,6-tetrahydrophthalic anhydride, maleic acid, maleic anhydride and mixtures thereof.

23. The process according to claim 16, wherein the alkylene oxide comprises about 20 wt. % to about 50 wt. % of the at least one ultraviolet (UV)-curable polyol.

24. The process according to claim 16, wherein the alkylene oxide comprises about 25 wt. % to about 50 wt. % of the at least one ultraviolet (UV)-curable polyol.

25. The process according to claim 16, wherein the alkylene oxide is chosen from propylene oxide, ethylene oxide, butylene oxide and mixtures thereof.

26. The process according to claim 16, wherein the isocyanate is chosen from 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, isophorone diisocyanate, the cyclohexane diisocyanates, hydrogenated tetramethylxylylene diisocyanate, hydrogenated toluene diisocyanates, hydrogenated methylene diphenylene diisocyanates, toluene diisocyanates, methylene diphenylene diisocyanates, polymethylene polyphenylene polyisocyanates and isocyanate-terminated prepolymers.

27. The process according to claim 16 further including adding at least one of a photoinitiator, photoactivator and a cross-linking agent.

28. The process according to claim 16, wherein the ultraviolet (UV)-curable polyol has an unsaturation of about 0.004 to about 0.008 meq/g.

29. One of a coating, adhesive, sealant and elastomer containing the ultraviolet (UV)-curable polyurethane composition made by the process according to claim 16.

30. In a process for producing one of a coating, adhesive, sealant and elastomer, the improvement comprising including the ultraviolet (UV)-curable polyurethane composition made by the process according to claim 16.

31. A coated substrate comprising a substrate having applied thereto an ultraviolet (UV)-curable polyurethane composition comprising, at least one isocyanate and at least one ultraviolet (UV)-curable polyol comprising a reaction product of about 30 wt. % to about 70 wt. % of a hydroxy functional compound having a functionality of about 2 to about 3, about 1 wt. % to about 10 wt. % of an unsaturated carboxylic acid or anhydride and about 20 wt. % to about 69 wt. % of an alkylene oxide, such that the sum of the percentages totals 100, wherein the at least one ultraviolet (UV)-curable polyol has an unsaturation of less than about 0.01 meq/g.

32. The coated substrate according to claim 31, wherein the hydroxy functional compound comprises about 30 wt. % to about 60 wt. % of the at least one ultraviolet (UV)-curable polyol.

33. The coated substrate according to claim 31, wherein the hydroxy functional compound comprises about 40 wt. % to about 60 wt. % of the at least one ultraviolet (UV)-curable polyol.

34. The coated substrate according to claim 31, wherein the hydroxy functional compound is chosen from polypropylene oxide, polyethylene oxide, polybutylene oxide, copolymers of propylene oxide and ethylene oxide, copolymers of propylene oxide and butylene oxide, copolymers of butylene oxide and ethylene oxide, and mixtures thereof.

35. The coated substrate according to claim 31, wherein the unsaturated carboxylic acid or anhydride comprises about 1 wt. % to about 5 wt. % of the at least one ultraviolet (UV)-curable polyol.

36. The coated substrate according to claim 31, wherein the unsaturated carboxylic acid or anhydride comprises about 2 wt. % to about 5 wt. % of the at least one ultraviolet (UV)-curable polyol.

37. The coated substrate according to claim 31, wherein the unsaturated carboxylic acid or anhydride is chosen from cis-1,2,3,6-tetrahydrophthalic acid, cis-1,2,3,6-tetrahydrophthalic anhydride, maleic acid, maleic anhydride and mixtures thereof.

38. The coated substrate according to claim 31, wherein the alkylene oxide comprises-about 20 wt. % to about 50 wt. % of the at least one ultraviolet (UV)-curable polyol.

39. The coated substrate according to claim 31, wherein the alkylene oxide comprises about 25 wt. % to about 50 wt. % of the at least one ultraviolet (UV)-curable polyol.

40. The coated substrate according to claim 31, wherein the alkylene oxide is chosen from propylene oxide, ethylene oxide, butylene oxide and mixtures thereof.

41. The coated substrate according to claim 31, wherein the isocyanate is chosen from 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, isophorone diisocyanate, the cyclohexane diisocyanates, hydrogenated tetramethylxylylene diisocyanate, hydrogenated toluene diisocyanates, hydrogenated methylene diphenylene diisocyanates, toluene diisocyanates, methylene diphenylene diisocyanates, polymethylene polyphenylene polyisocyanates and isocyanate-terminated prepolymers.

42. The coated substrate according to claim 31 further including at least one of a photoinitiator, photoactivator and a cross-linking agent.

* * * * *